(12) United States Patent  
Horng et al.

(10) Patent No.: US 7,391,140 B2
(45) Date of Patent: Jun. 24, 2008

(54) MAGNETICALLY COUPLED HEAT DISSIPATING FAN

(75) Inventors: Alex Horng, Kaohsiung (TW); Masaharu Miyahara, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/418,233

(22) Filed: May 5, 2006

(65) Prior Publication Data

US 2007/0210660 A1  Sep. 13, 2007

(30) Foreign Application Priority Data

Mar. 10, 2006  (TW) .............................. 95108071 A (51) Int. Cl.
  *H02K 7/65* (2006.01)
  *H02K 7/75* (2006.01)
(52) U.S. Cl. .................. 310/90; 310/90.5; 310/104; 417/420
(58) Field of Classification Search ............ 310/90, 310/67 R, 104; 417/420, 354
  See application file for complete search history.

(56) References Cited

U.S. PATENT DOCUMENTS

| 3,013,167 | A | * | 12/1961 | Bobula | 310/90 |
| 3,680,984 | A | * | 8/1972 | Young et al. | 417/420 |
| 5,019,735 | A | * | 5/1991 | Lee | 310/89 |
| 5,061,868 | A | * | 10/1991 | Iwazaki et al. | 310/67 R |
| 5,497,039 | A | * | 3/1996 | Blaettner et al. | 310/51 |
| 5,757,615 | A |  | 5/1998 | Donahoe et al. |  |
| 6,246,136 | B1 | * | 6/2001 | Ichiyama | 310/90 |
| 6,280,089 | B1 | * | 8/2001 | Horng | 384/129 |
| 6,417,591 | B1 | * | 7/2002 | Saito et al. | 310/104 |
| 6,420,810 | B1 | * | 7/2002 | Jeong | 310/90.5 |
| 6,435,722 | B1 | * | 8/2002 | Horng | 384/279 |
| 6,744,172 | B2 | * | 6/2004 | Duhua | 310/254 |
| 6,844,641 | B1 | * | 1/2005 | Horng et al. | 310/89 |
| 6,900,990 | B2 |  | 5/2005 | Tomioka |  |
| 6,906,919 | B2 |  | 6/2005 | Pokharna et al. |  |
| 7,176,596 | B2 | * | 2/2007 | Hong et al. | 310/90 |
| 2004/0027017 | A1 | * | 2/2004 | Alex et al. | 310/90 |
| 2005/0083657 | A1 |  | 4/2005 | Hamman |  |
| 2007/0035189 | A1 | * | 2/2007 | Matsumoto | 310/89 |

\* cited by examiner

*Primary Examiner*—Darren Schuberg
*Assistant Examiner*—Naishadh N Desai
(74) *Attorney, Agent, or Firm*—Muncy, Geissler, Olds & Lowe, PLLC (57) ABSTRACT

A heat-dissipating fan includes a casing, a stator, and an impeller. The casing includes a base supported by a plurality of ribs. The base includes an axial tube for receiving a bearing through which a shaft extends. Vanes are provided on an outer circumferential wall of the impeller. An end of the shaft is fixed to an axial seat at a center of the impeller. A magnetic member is mounted to the other end of the shaft. The magnetic member and the impeller rotate synchronously under magnetic induction. When the heat-dissipating fan is mounted on top of a heat-dissipating device, a propeller of the heat-dissipating device is driven to turn synchronously under magnetic attraction. When air currents are driven by the vanes to flow downward, great noise resulting from tangential wind effect is avoided, as the ribs are not in the air inlet area.

7 Claims, 8 Drawing Sheets

MAGNETICALLY COUPLED HEAT DISSIPATING FAN

BACKGROUND OF THE INVENTION

1. Field of the Invention

The present invention relates to a heat-dissipating fan. More particularly, the present invention relates to a heat-dissipating fan for effectively lowering noise resulting from tangential wind effect.

2. Description of Related Art

Figure 1:
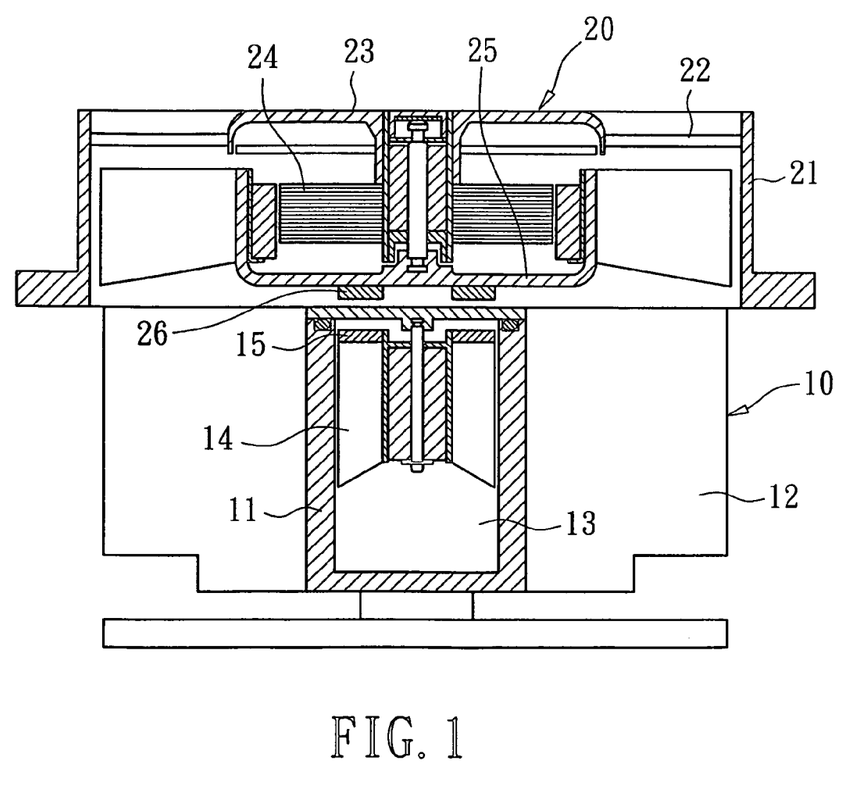
FIG. 1 is a sectional view of a device with a conventional heat-dissipating fan.

FIG. 1 illustrates a sectional view of a device, which is described in copending U.S. patent application Ser No. 11/272,678, the entire specification of which incorporated herein by reference. The device comprises a heat-dissipating device 10 and a heat-dissipating fan 20. The heat-dissipating device 10 is in direct contact with a heat-generating component for absorbing heat energy. The heat-dissipating fan 20 is mounted above the heat-dissipating device 10 for assisting in dissipation of heat.

The heat-dissipating device 10 includes a central heat-conducting member 11 and a plurality of peripheral fins 12 extending outward from the central heat-conducting member 11. The central heat-conducting member 11 includes a compartment 13 in which a propeller 14 is mounted.

The heat-dissipating fan 20 is mounted on top of the heat-dissipating device 10 in an inverted state. The heat-dissipating fan 20 includes a casing 21 and a base 23 fixedly supported by a plurality of ribs 22 in the casing 21. A stator 24 and a rotor 25 are mounted on the base 23. Magnetic members 26 and 15 are respectively mounted on the rotor 25 and the propeller 14 to provide a mutually attracting effect for allowing synchronous rotation of the rotor 25 and the propeller 14.

However, the heat-dissipating fan 20 in an inverted state generates great noise due to tangential wind effect. More specifically, the ribs 22 for fixing the base 23 must extend across the air inlet area for mounting the heat-dissipating fan 20 in the inverted state. When the rotor 25 rotates and drives air downward, the ribs 22 extending across the air inlet area create a wind barrier and thus generate turbulence, leading to great noise due to tangential wind effect.

SUMMARY OF THE INVENTION

A heat-dissipating fan in accordance with the present invention comprises a casing, a stator, and an impeller. The casing comprises a base and a plurality of ribs for supporting the base. The base includes an axial tube at a center thereof. A bearing is mounted in the axial tube. The stator is mounted on the base. The impeller comprises a plurality of vanes on an outer circumferential wall thereof. The impeller further comprises an axial seat at a center thereof. A shaft includes a first end fixed to the axial seat and a second end. The shaft extends through the bearing. A magnetic member is mounted to the second end of the shaft. The magnetic member and the impeller rotate synchronously under magnetic induction.

The heated-dissipating fan is mounted on a heat-dissipating device that includes a propeller driven by the magnetic member.

In an embodiment, the second end of the shaft includes a first annular groove and a second annular groove that is adjacent to the second end of the shaft. A first retaining member is mounted in the first annular groove and a second retaining member is mounted in the second annular groove. The shaft further includes a flat surface in a section of an outer circumference of the shaft adjacent to the second annular groove, providing a non-circular section on the shaft. The magnetic member includes a central axial hole through which the shaft extends. The central axial hole of the magnetic member includes a flat section for engaging with the flat surface of the shaft.

Preferably, a spring is mounted between the magnetic member and the second retaining member.

Preferably, the magnetic member includes a recess for receiving the spring.

In another embodiment, the second end of the shaft includes a first annular groove and a second annular groove that is adjacent to the second end of the shaft. A first retaining member is mounted in the first annular groove and a second retaining member is mounted in the second annular groove. The shaft further includes a flat surface in a section of an outer circumference of the shaft adjacent to the second annular groove, providing a non-circular section on the shaft. The magnetic member is mounted to a bottom side of a magnet base. The magnet base includes a fixing seat that has a central axial hole through which the shaft extends. The central axial hole includes a flat section for engaging with the flat surface of the shaft.

Preferably, a spring is mounted between the magnet base and the second retaining member.

When the heat-dissipating fan is mounted on top of a heat-dissipating device, a propeller of the heat-dissipating device is driven to turn synchronously under magnetic attraction. When air currents are driven by the vanes to flow downward, great noise resulting from tangential wind effect is avoided, as the ribs of the heat-dissipating fan are not in the air inlet area.

Other objects, advantages and novel features of this invention will become more apparent from the following detailed description when taken in conjunction with the accompanying drawings.

DETAILED DESCRIPTION OF THE PREFERRED EMBODIMENTS

The present invention relates to a heat-dissipating fan that synchronously drives a propeller of a heat-dissipating device by magnetic attraction. Preferred embodiments of the present invention are now described with reference to the accompanying drawings.

Figure 2:
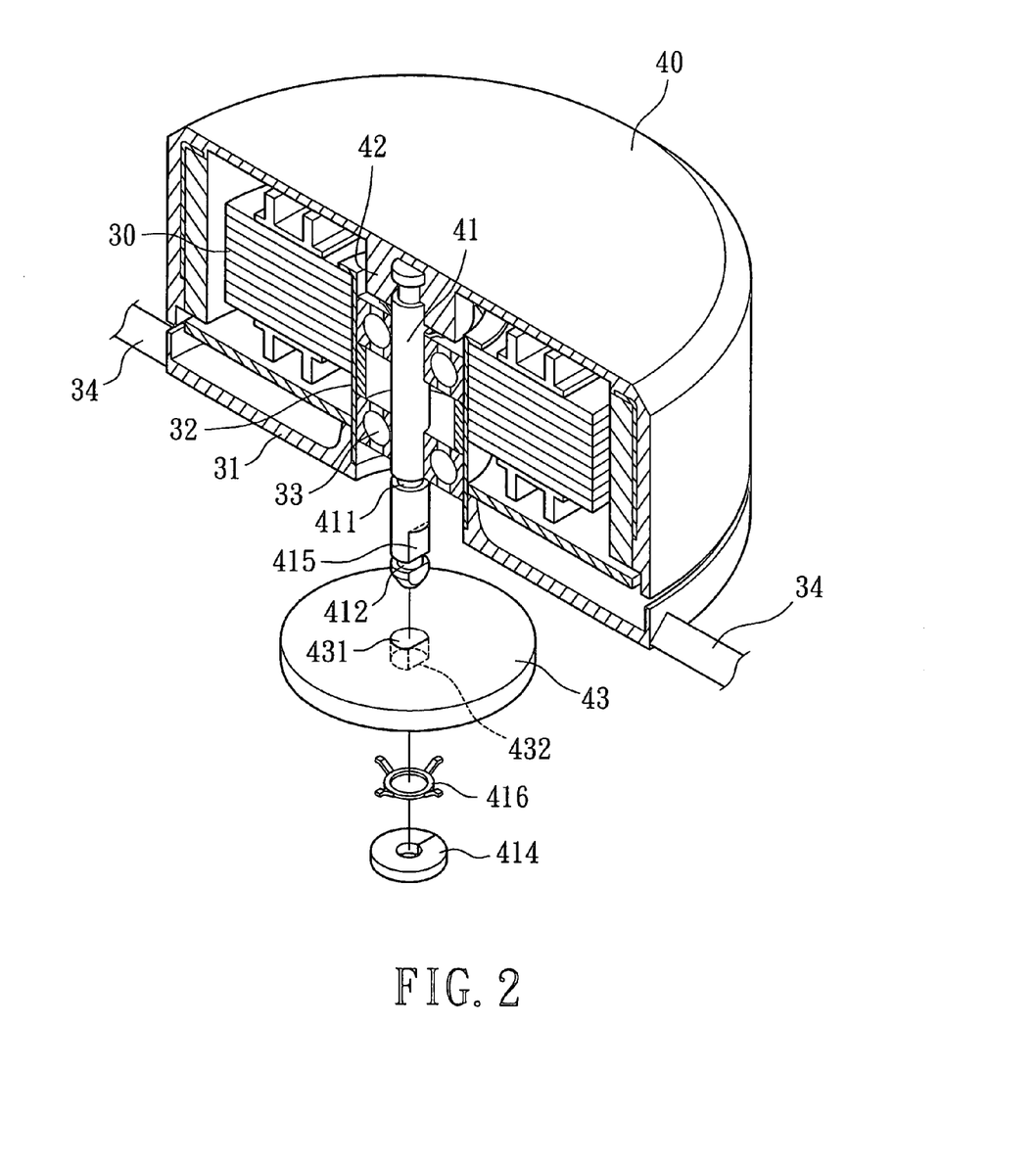
FIG. 2 is an exploded perspective view, partly cutaway, of a first embodiment of a heat-dissipating fan in accordance with the present invention.
Figure 3:
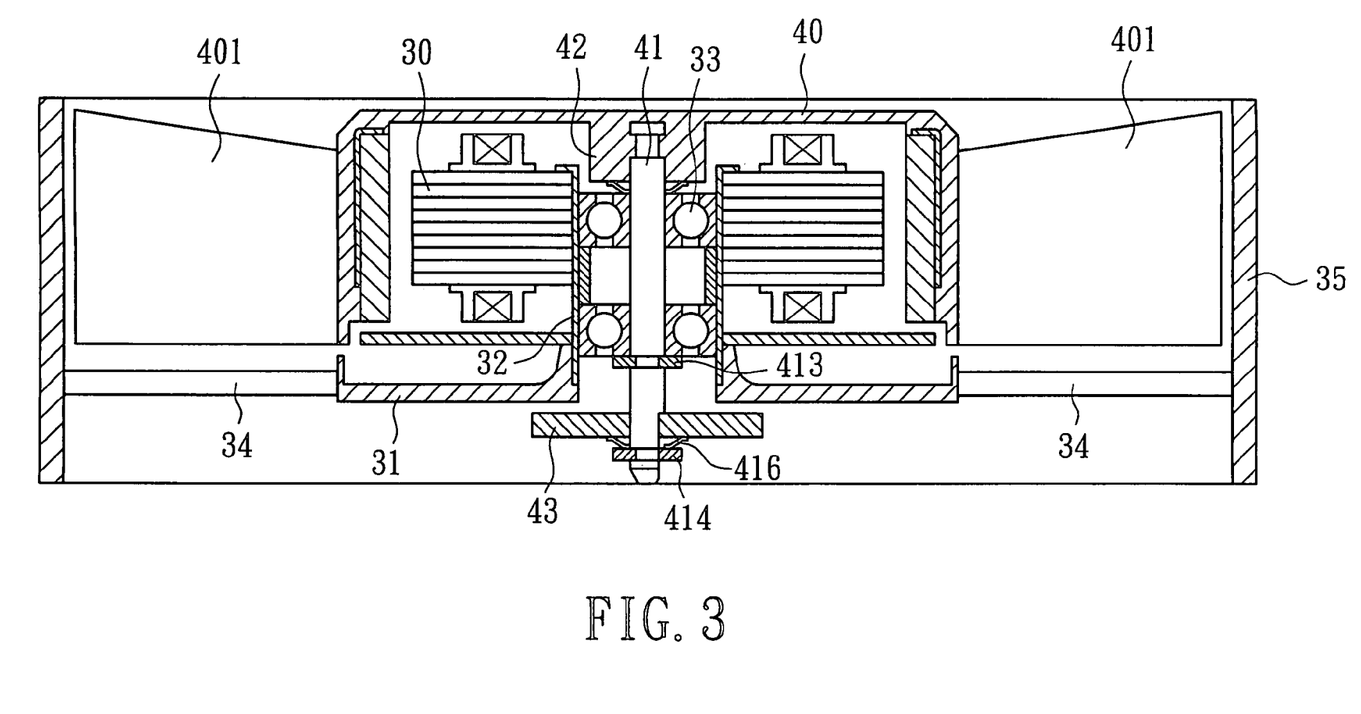
FIG. 3 is a sectional view of the heat-dissipating fan in FIG. 2.

Referring to FIGS. 2 and 3, a first embodiment of a heat-dissipating fan in accordance with the present invention comprises a casing 35 in which a stator 30 and an impeller 40 are mounted. The casing 35 includes a base 31 that is connected to and thus supported by a plurality of ribs 34 between the base 31 and an inner circumferential wall of the casing 35. The base 31 includes an axial tube 32 at a center thereof, and a bearing 33 is mounted in the axial tube 32. The stator 30 is mounted around the axial tube 32.

A plurality of vanes 401 extend from an outer circumferential wall of the impeller 40. The impeller 40 includes an axial seat 42 at a center thereof. A first end of a shaft 41 is fixed to the axial seat 42. The shaft 41 is rotatably extended through the bearing 33. A magnetic member 43 is mounted to a second end of the shaft 41 extending through the bearing 33. Thus, the impeller 40 is mounted around the stator 30 and the impeller 40 is driven to turn through magnetic energizing.

The magnetic member 43 and the shaft 41 can be fixed in many ways. In the embodiment shown in FIGS. 2 and 3, the shaft 41 includes a first annular groove 411 and a second annular groove 412 spaced from the first annular groove 411 by an appropriate distance. A first retaining ring 413 is mounted in the first annular groove 413 and retained below the bearing 33, preventing the shaft 41 from disengaging from the bearing 33. The shaft 41 further includes a flat surface 415 in a section of an outer circumference of the shaft 41 adjacent to the second annular groove 412 that is adjacent to the second end of the shaft 41. Thus, the shaft 41 is non-circular in this section. The magnetic member 43 includes a non-circular axial hole 431 in a center thereof through which the shaft 41 extends. The non-circular axial hole 431 includes a flat section 432 for engaging with the flat surface 415 of the shaft 41. Thus, the magnetic member 43 and the shaft 41 rotate synchronously after a spring 416 and a second retaining member 414 are mounted into the second annular groove 412. It is noted that the spring 416 is mounted between the magnetic member 43 and the second retaining member 414.

Figure 4:
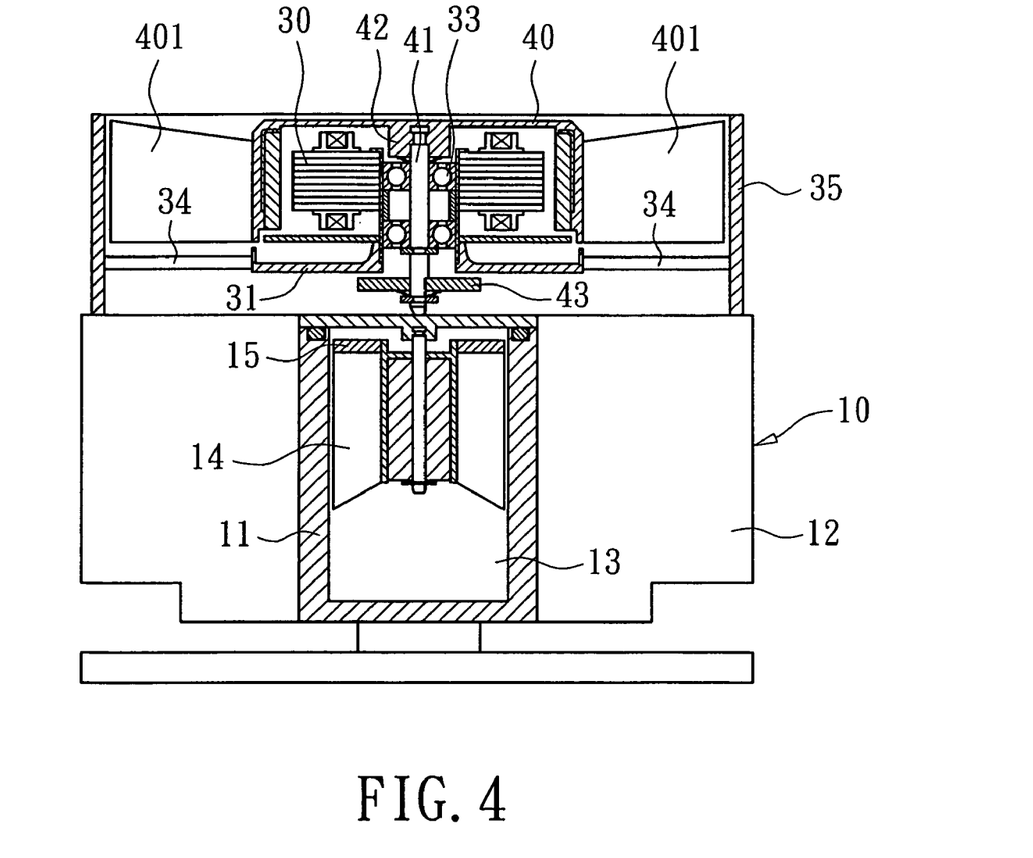
FIG. 4 is a sectional view illustrating use of the heat-dissipating fan in FIG. 2 with a heat-dissipating device.

Referring to FIG. 4, when the heat-dissipating fan in accordance with the present invention is used with a heat-dissipating device 10, the heat-dissipating fan is mounted on top of the heat-dissipating device 10 in an upside-up state. A propeller 14 in the heat-dissipating device 10 is driven to turn synchronously with the impeller 40 under the action of magnetic attraction. Thus, when the impeller 40 turns, the vanes 401 drives air to flow downward, great noise resulting from tangential wind effect is avoided, as the ribs 34 are not in the air inlet area.

Figure 5:
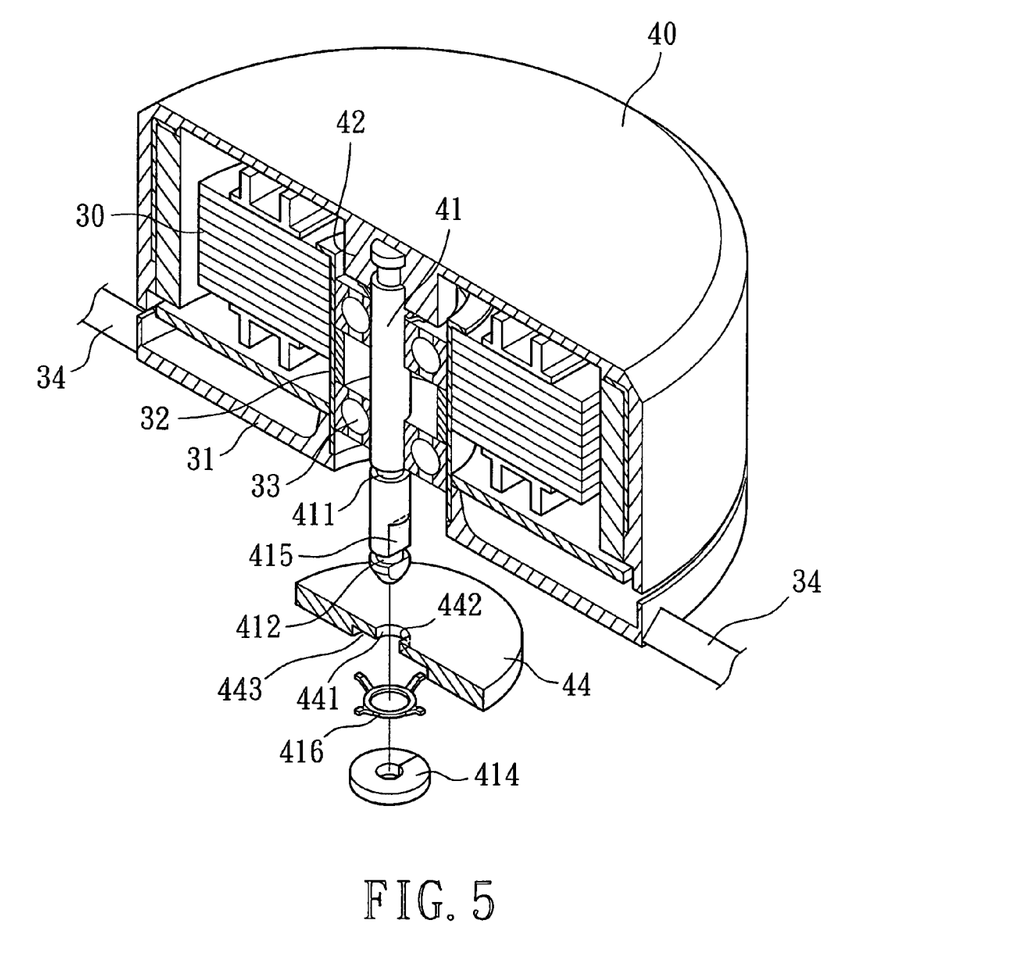
FIG. 5 is an exploded perspective view, partly cutaway, of a second embodiment of the heat-dissipating fan in accordance with the present invention.
Figure 6:
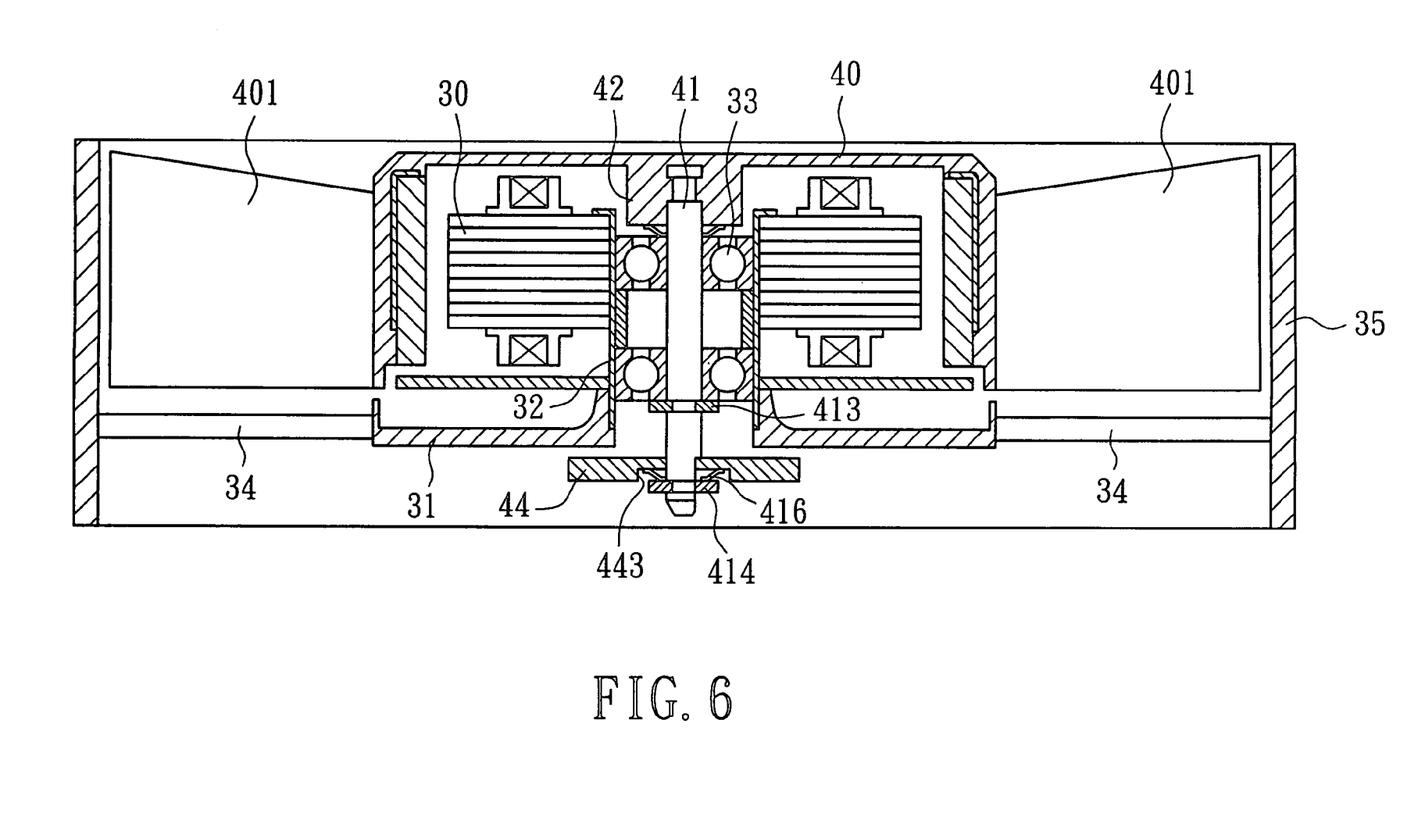
FIG. 6 is a sectional view of the heat-dissipating fan in FIG. 5.

FIGS. 5 and 6 illustrate a second embodiment for fixing the magnetic member 44 and the shaft 41. In this embodiment, the shaft 41 also includes a flat surface 415 in a section of an outer circumference of the shaft 41 adjacent to the second annular groove 412. Thus, the shaft 41 is non-circular in this section. The magnetic member 44 includes a non-circular axial hole 441 in a center thereof through which the shaft 41 extends. The non-circular hole 441 includes a flat section 442 for engaging with the flat surface 415 of the shaft 41. Further, a recess 443 is defined in a bottom side of the magnetic member 44 for receiving the spring 416. Thus, the magnetic member 44 and the shaft 41 rotate synchronously after the second retaining member 414 is mounted into the second annular groove 412.

Figure 7:
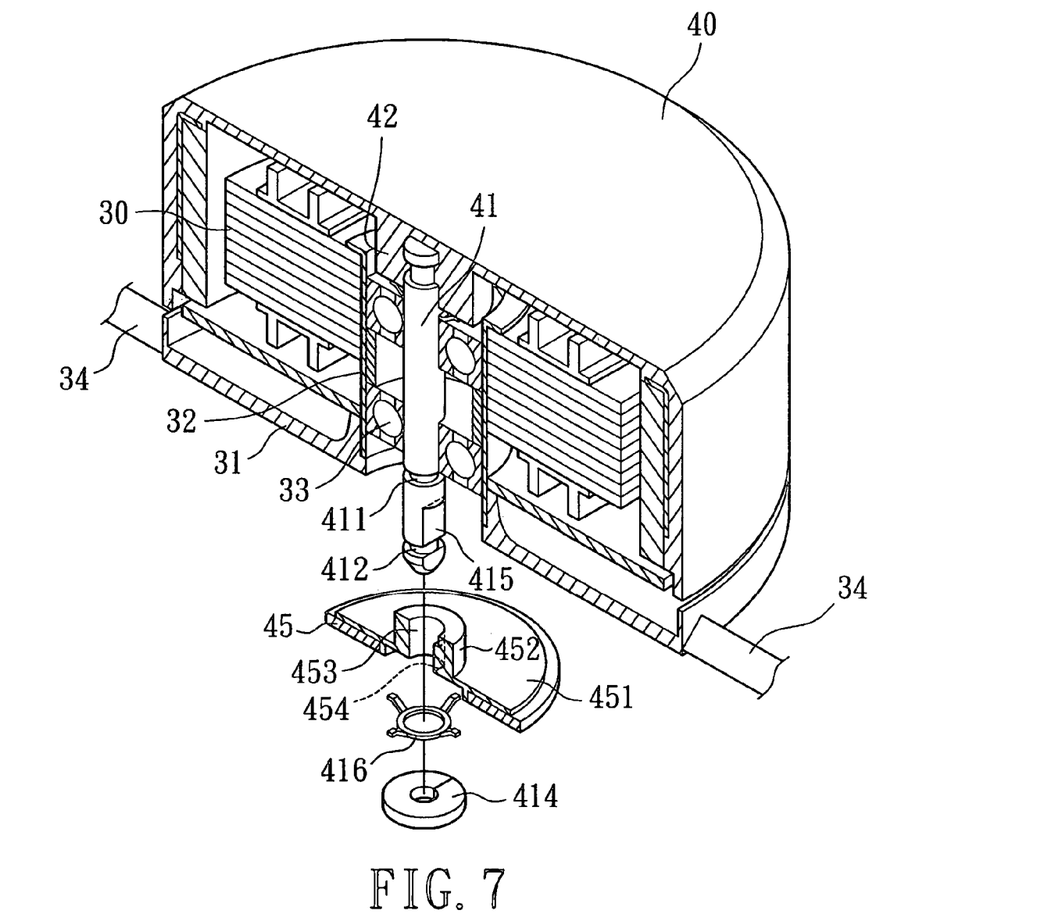
FIG. 7 is an exploded perspective view of a third embodiment of the heat-dissipating fan in accordance with the present invention.
Figure 8:
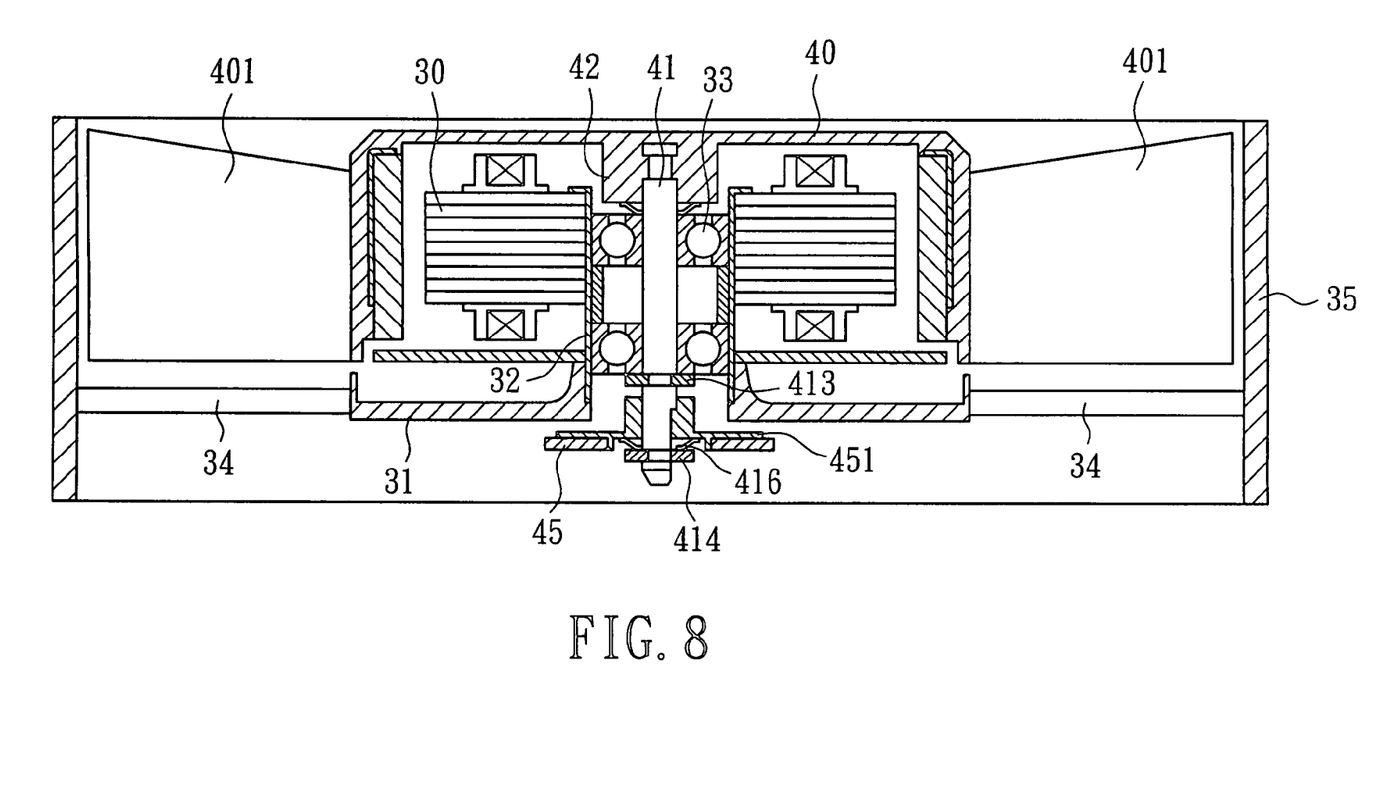
FIG. 8 is a sectional view of the heat-dissipating fan in FIG. 7.

FIGS. 7 and 8 illustrate a third embodiment for fixing the magnetic member 45 and the shaft 41. In this embodiment, the magnetic member 45 is engaged with the shaft 41 via a magnet base 451. The magnetic member 45 is fixed below the magnet base 451 that includes a fixing seat 452 at a center thereof. An axial hole 453 is defined in a center of the fixing seat 452, and the shaft 41 is extended through the axial hole 453. The shaft 41 also includes a flat surface 415 in a section of an outer circumference of the shaft 41 adjacent to the second annular groove 412. Thus, the shaft 41 is non-circular in this section. The axial hole 453 includes a flat section 454 for engaging with the flat surface 415 of the shaft 41. Further, a recess (not labeled) is defined in a bottom side of the magnet base 451 for receiving the spring 416. Thus, the magnet base 451, the magnetic member 45, and the shaft 41 rotate synchronously after the spring 416 and the second retaining member 414 are mounted into the second annular groove 412. It is noted that the spring 416 is mounted between the magnet base 451 and the second retaining member 414.

In conclusion, since the ribs 34 of the heat-dissipating fan in accordance with the present invention are not in the air inlet area, great noise resulting from tangential wind effect is avoided.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A heat-dissipating fan comprising:
   a casing comprising a base and a plurality of ribs for supporting the base, the base including an axial tube at a center thereof, a bearing being mounted in the axial tube;
   a stator mounted on the base; and
   an impeller comprising a plurality of vanes on an outer circumferential wall thereof, the impeller further comprising an axial seat at a center thereof, a shaft including a first end fixed to the axial seat and a second end, the shaft extending through the bearing, a magnetic member being mounted to the second end of the shaft, the magnetic member and the impeller rotating synchronously under magnetic induction, wherein the second end of the shaft includes a first annular groove and a second annular groove that is adjacent to the second end of the shaft, further comprising a first retaining member mounted in the first annular groove and a second retaining member mounted in the second annular groove, the shaft further includes a flat surface in a section of an outer circumference of the shaft adjacent to the second angular groove to provide a non-circular section on the shaft, the magnetic member includes a central axial hole through which the shaft extends, and the central axial hole of the magnetic member includes a flat section for engaging with the flat surface of the shaft.

2. The heat-dissipating fan as claimed in claim 1 wherein the heat-dissipating fan is adapted to be mounted on a heat-dissipating device including a propeller driven by the magnetic member.

3. The heat-dissipating fan as claimed in claim 1, further comprising a spring mounted between the magnetic member and the second retaining member.

4. The heat-dissipating fan as claimed in claim 3 wherein the magnetic member includes a recess for receiving the spring.

5. A heat-dissipating fan comprising:
   a casing comprising a base and a plurality of ribs for supporting the base, the base including an axial tube at a center thereof, a bearing being mounted in the axial tube;
   a stator mounted on the base; and
   an impeller comprising a plurality of vanes on an outer circumferential wall thereof, the impeller further comprising an axial seat at a center thereof, a shaft including a first end fixed to the axial seat and a second end, the shaft extending through the bearing, a magnetic member being mounted to the second end of the shaft, the magnetic member and the impeller rotating synchronously under magnetic induction, wherein the second end of the shaft includes a first annular groove and a second annular groove that is adjacent to the second end of the shaft, further comprising a first retaining member mounted in the first annular groove and a second retaining member mounted in the second annular groove, the shaft further includes a flat surface in a section of an outer circumference of the shaft adjacent to the second annular groove, to provide a non-circular section on the shaft, further comprising a magnet base, the magnetic member is mounted to a bottom side of the magnet base, the magnet base includes a fixing seat that has a central axial hole through which the shaft extends, and the central axial hole includes a flat section for engaging with the flat surface of the shaft.

6. The heat-dissipating fan as claimed in claim 5, further comprising a spring mounted between the magnet base and the second retaining member.

7. The heat dissipating fan as claimed in claim 5, wherein the heat dissipating fan is adapted to be mounted on a heat dissipating device including a propeller driven by the magnetic member.

\* \* \* \* \*